United States Patent
Hodge et al.

(10) Patent No.: US 12,473,529 B2
(45) Date of Patent: Nov. 18, 2025

(54) REAGENTS, REAGENT KITS, AND CULTURE MEDIA FOR ACTIVATING AND EXPANDING IMMUNE CELLS AND USES THEREOF

(71) Applicant: Nanotein Technologies, Inc., Berkeley, CA (US)

(72) Inventors: Curtis Daniel Hodge, Pinole, CA (US); Patrick Michael Carney, Berkeley, CA (US); Zachary Ibrahim Imam, Concord, CA (US)

(73) Assignee: Nanotein Technologies, Inc., Berkeley, CA (US)

( * ) Notice: Subject to any disclaimer, the term of this patent is extended or adjusted under 35 U.S.C. 154(b) by 0 days.

(21) Appl. No.: 18/731,209

(22) Filed: May 31, 2024

(65) Prior Publication Data

US 2025/0027036 A1    Jan. 23, 2025

Related U.S. Application Data

(60) Provisional application No. 63/514,243, filed on Jul. 18, 2023.

(51) Int. Cl.
| | |
|---|---|
| C12N 5/10 | (2006.01) |
| C07K 16/28 | (2006.01) |
| C12N 5/00 | (2006.01) |
| C12N 5/0783 | (2010.01) |
| C12N 5/16 | (2006.01) |

(52) U.S. Cl.
CPC ........ *C12N 5/0018* (2013.01); *C07K 16/2809* (2013.01); *C07K 16/2818* (2013.01); *C12N 5/0636* (2013.01); *C12N 2500/38* (2013.01); *C12N 2501/90* (2013.01)

(58) Field of Classification Search
CPC ............... C12N 5/0018; C12N 5/0636; C12N 2500/38; C12N 2501/90; C07K 16/2809; C07K 16/2818
See application file for complete search history.

(56) References Cited

U.S. PATENT DOCUMENTS

| | | | |
|---|---|---|---|
| 7,030,094 B2 * | 4/2006 | Mossman | A61K 31/739 424/282.1 |
| 12,227,552 B2 | 2/2025 | Hodge et al. | |
| 2003/0166877 A1 | 9/2003 | Gillies et al. | |
| 2006/0078951 A1 | 4/2006 | Youn et al. | |
| 2016/0311859 A1 | 10/2016 | Jerala et al. | |
| 2020/0268902 A1 | 8/2020 | Xu | |
| 2021/0094995 A1 | 4/2021 | Hubbell et al. | |
| 2021/0139935 A1 | 5/2021 | Carson et al. | |
| 2021/0253731 A1 | 8/2021 | Robson et al. | |
| 2022/0002383 A1 | 1/2022 | Wong et al. | |
| 2022/0143214 A1 | 5/2022 | Deverman et al. | |
| 2022/0196655 A1 * | 6/2022 | Hodge | C07K 7/08 |
| 2022/0204582 A1 | 6/2022 | Chaudhary | |
| 2022/0332800 A1 | 10/2022 | Das et al. | |
| 2022/0339193 A1 | 10/2022 | Xiao et al. | |
| 2022/0395566 A1 * | 12/2022 | Bufali | A61P 31/04 |
| 2022/0396623 A1 | 12/2022 | Sainson | |
| 2023/0057310 A1 * | 2/2023 | Flechtner | A61K 39/39 |
| 2023/0174628 A1 | 6/2023 | Xie et al. | |
| 2025/0011383 A1 | 1/2025 | Hodge et al. | |

FOREIGN PATENT DOCUMENTS

| | | |
|---|---|---|
| CN | 108060130 | 12/2018 |
| EP | 2824112 | 12/2016 |
| KR | 20130039672 | 4/2013 |
| WO | WO 2001/045746 | 6/2001 |
| WO | WO 2000/068248 | 11/2003 |
| WO | WO 2004/056392 | 7/2004 |
| WO | WO 2005/049085 | 6/2005 |
| WO | WO 2006/138670 | 12/2006 |
| WO | WO 2013/052015 | 4/2013 |
| WO | WO 2014/124301 | 8/2014 |
| WO | WO 2016/037154 | 3/2016 |
| WO | WO 2018/170362 | 9/2018 |
| WO | WO 2018/172447 | 9/2018 |
| WO | WO 2022/031359 | 2/2022 |
| WO | WO 2023/154731 | 8/2023 |

OTHER PUBLICATIONS

Kleiveland CR. Peripheral Blood Mononuclear Cells. In: Verhoeckx K, Cotter P, López-Expósito I, et al., editors. The Impact of Food Bioactives on Health: in vitro and ex vivo models [Internet]. Cham (CH): Springer; 2015. Chapter 15. Available from: https://www.ncbi.nlm.nih.gov/books/NBK500157/ (Year: 2015).*

Marty-Roix R. et al. Identification of QS-21 as an Inflammasome-activating Molecular Component of Saponin Adjuvants. J Biol Chem. Jan. 15, 2016;291(3):1123-36. doi: 10.1074/jbc.M115.683011. Epub Nov. 10, 2015. PMID: 26555265; PMCID: PMC4714196 (Year: 2015).*

Cibulski, S.P. et al. Quillaja brasiliensis saponin-based nanoparticulate adjuvants are capable of triggering early immune responses. Sci Rep 8, 13582 (2018) (Year: 2018).*

Centers for Disease Control and Prevent, Adjuvants and Vaccines. Retrieved Jul. 9, 2023 from https://www.cdc.gov/vaccinesafety/concerns/adjuvants.html.

Hearnden, Claire, and Ed C. Lavelle. Adjuvant strategies for vaccines: the use of adjuvants within the cancer vaccine setting. Cancer Immunotherapy. Academic Press, 333-349 (2013).

(Continued)

*Primary Examiner* — Maria G Leavitt
*Assistant Examiner* — Vyoma Shubham Tiwari
(74) *Attorney, Agent, or Firm* — Levine Bagade Han LLP

(57) ABSTRACT

Disclosed herein are reagents, reagent kits, and culture media for activating and expanding immune cells in vitro. In some embodiments, the reagents, reagent kits, and culture media comprise a *Quillaja* saponin. In other embodiments, the reagents, reagent kits, and culture media comprise a squalene-based emulsion. Also disclosed are methods for activating and expanding immune cells in vitro using the reagents, reagent kits, and culture media.

4 Claims, 6 Drawing Sheets

Specification includes a Sequence Listing.

(56) References Cited

OTHER PUBLICATIONS

Kensil, Charlotte R., et al. Separation and characterization of saponins with adjuvant activity from Quillaja saponaria Molina cortex. Journal of Immunology 146.2: 431-437 (1991).
Lacaille-Dubois, Marie-Aleth. Updated insights into the mechanism of action and clinical profile of the immunoadjuvant QS-21: A review. Phytomedicine 60: 152905 (2019).
Morel, Sandra, et al. Adjuvant System AS03 containing α-tocopherol modulates innate immune response and leads to improved adaptive immunity. Vaccine 29.13: 2461-2473 (2011).
Romagnani, Sergio. Th1/th2 cells. Inflammatory bowel diseases 5.4: 285-294 (1999).
Shi, S. et al. Vaccine adjuvants: Understanding the structure and mechanism of adjuvanticity. Vaccine 37, 3167-3178 (2019).
Singh, M. & O'Hagan, D.T. Recent advances in veterinary vaccine adjuvants. Int. J. Parasitol. 33, 469-478 (2003).
Wang, P. Natural and Synthetic Saponins as Vaccine Adjuvants. Vaccines (Basel) 9, 222 (2021).
Zhu, Daming, and Wenbin Tuo. QS-21: a potent vaccine adjuvant. Natural Products Chemistry & Research 3.4 (2016).
Anderson et al., An improved capping unit for stabilizing the ends of the associated β-strands, Department of Chemistry, FEBS Letters 588, 4749-4753 (2014).β
Benson, H.L et al. Endogenous matrix metalloproteinases 2 and 9 regulate activation of CD4+ and CD8+ T cells. Am J Respir Cell Mol Biol 44, 700-708 (2011).
Brooks, A.J. et al. Mechanism of activation of protein kinase JAK2 by the growth hormone receptor. Science 344, 1249783 (2014).
de Almeida, L.G.N. et al. Matrix Metalloproteinases: From Molecular Mechanisms to Physiology, Pathophysiology, and Pharmacology. Pharmacol. Rev. 74, 712-768 (2022).
de Taeye, S.W. et al. FcgammaR Binding and ADCC Activity of Human IgG Allotypes. Front. Immunol. 11, 740 (2020).
Edsparr, K., Basse, P.H., Goldfarb, R.H. & Albertsson, P. Matrix metalloproteinases in cytotoxic lymphocytes impact on tumour infiltration and immunomodulation. Cancer Microenviron 4, 351-360 (2011).
Isoda, Y. et al. Importance of the Side Chain at Position 296 of Antibody Fc in Interactions with FcgammaRIIIa and Other Fcgamma Receptors. PLOS One 10, e0140120 (2015).
Johnatty, R.N. et al. Cytokine and chemokine regulation of proMMP-9 and TIMP-1 production by human peripheral blood lymphocytes. J. Immunol. 158, 2327-2333 (1997).
Kang et al., Developing an antibody-binding protein cage as a molecular recognition drug modular nanoplatform. Biomaterials, 33, 5423-5430 (2012).
Lai et al., Designing and defining dynamic protein cage nanoassemblies in solution., Sciences Advances, (2), 1-12 (2016).
Lai et al., Structure and Flexibility of Nanoscale Protein Cages Designed by Symmetric Self-Assembly., J. Am. Chem. Soc. 135(20), 7738-7743 (2013).
Levin, A.M. et al. Exploiting a natural conformational switch to engineer an interleukin-2 'superkine'. Nature 484, 529-533 (2012).
Liao, W., Lin, J.X. & Leonard, W.J. Interleukin-2 at the crossroads of effector responses, tolerance, and immunotherapy. Immunity 38, 13-25 (2013).
Liu et al., A 3.8 A resolution cryo-EM structure of a small protein bound to an imaging scaffoled., Nature Communications, 1864(10), 1-7 (2019).
Liu et al., Near-atomic cryo-EM imaging of a small protein displaed on a designed scaffolding system., PNAS, 115(13), 3362-3367 (2018).
Liu, X. et al. Human immunoglobulin G hinge regulates agonistic anti-CD40 immunostimulatory and antitumour activities through biophysical flexibility. Nature Communications 10, 4206 (2019).
Mayes, P.A., Hance, K.W. & Hoos, A. The promise and challenges of immune agonist antibody development in cancer. Nat. Rev. Drug Discov. 17, 509-527 (2018).
O'Shea, J.J. & Plenge, R. Jak and STAT signaling molecules in immunoregulation and immune-mediated disease. Immunity 36, 542-550 (2012).
Powell, M.S. & Hogarth, P.M. Fc receptors. Adv. Exp. Med. Biol. 640, 22-34 (2008).
Shields, R.L. et al. High resolution mapping of the binding site on human IgG1 for Fc gamma RI, Fc gamma RII, Fc gamma RIII, and FcRn and design of IgG1 variants with improved binding to the Fc gamma R. J. Biol. Chem. 276, 6591-6604 (2001).
Sivori et al., NKp46 is the major triggering receptor involved in the natural cytotoxicity of fresh or cultured human NK cells. Correlation between surface density of NKp46 and natural cytotoxicity against autologous, allogenic or xenogenic target cells. Eur. J. Immunol. 29, 1656-1666 (1999).
Sivori et al., p46 a Novel Natural Killer Cell-Specific Surface Molecule That Mediates Cell Activation., J. Exp. Med., 1997, 186(7), 1129-1136 (1997).
Song, J. et al. PROSPER: an integrated feature-based tool for predicting protease substrate cleavage sites. PLOS One 7, e50300 (2012).
Spangler, J.B., Moraga, I., Mendoza, J.L. & Garcia, K.C. Insights into cytokine- receptor interactions from cytokine engineering. Annu. Rev. Immunol. 33, 139-167 (2015).
Yen-Ting et al., Structure and Flexibility of Nanoscale Protein Cages Designed by Symmetric Self-Assembly. Journal of the American Chemical Society, 135, 7738-7743 (2013).

\* cited by examiner

REAGENTS, REAGENT KITS, AND CULTURE MEDIA FOR ACTIVATING AND EXPANDING IMMUNE CELLS AND USES THEREOF

CROSS-REFERENCE TO RELATED APPLICATION

This application claims priority to U.S. Patent Application No. 63/514,243 filed on Jul. 18, 2023, the content of which is incorporated herein by reference in its entirety.

REFERENCE TO AN ELECTRONIC SEQUENCE LISTING

This application contains a Sequence Listing which has been submitted via Patent Center and is hereby incorporated by reference in its entirety. Said .xml copy, created on Apr. 30, 2024 is named 05_NNTNNZ00200_sequence_ listing.xml and is 5,183 bytes in size.

TECHNICAL FIELD

This disclosure relates generally to the field of cell therapies and, more specifically, to reagents, reagent kits, and culture media for activation and expansion of immune cells and uses thereof.

BACKGROUND

Adjuvants are substances that are used to increase the efficacy or potency of a drug or vaccine. The use of adjuvants began with aluminum salts after it was found that they strengthened the body's immune response to diphtheria and tetanus vaccines [1]. Modern day adjuvants include, for example, oil-in-water emulsions and saponin-based adjuvants extracted from the Chilean soapbark tree. Oil-in-water emulsions are a commonly used type of vaccine adjuvant that includes AS03, a squalene-based emulsion, which has been used as an adjuvant for influenza A (H5N1) [2].

Saponins come from the bark, stem, roots, and flowers of several plant species and are made up of sterol glycosides and triterpenoid glycosides [3] Quil-A is a saponin-based adjuvant used in a wide variety of veterinary vaccines [4]. QS-21 is a purified fraction of the *Quillaja* saponin composed of two isomeric bidesmosidic saponins from the *Quillaja saponaria* Molina tree [5]. QS-21 is currently used in vaccines for malaria and shingles [6].

While adjuvants have been used safely in vaccines for decades, the active ingredients of such adjuvants have, heretofore, not been explored in the biomanufacturing of cell-based immunotherapies in vitro. More specifically, squalene-based emulsions and saponins have not been explored for activating and expanding immune cells in vitro as part of a biomanufacturing process for cell-based immunotherapies.

SUMMARY

Disclosed are reagents or additives, reagent kits, and culture media capable of facilitating the activation and expansion of immune cells.

In some embodiments, disclosed is a reagent for activating and expanding immune cells in vitro comprising a *Quillaja* saponin.

In some embodiments, the *Quillaja* saponin can be derived from the inner bark or cortex of the *Quillaja saponaria* Molina tree.

In some embodiments, the *Quillaja* saponin can be dissolved in water.

In some embodiments, the *Quillaja* saponin can be initially in a lyophilized form before being dissolved in water.

In some embodiments, the *Quillaja* saponin can be a purified *Quillaja* saponin.

In some embodiments, the purified *Quillaja* saponin can be QS-21.

In some embodiments, the QS-21 can be dissolved in phosphate buffered saline (PBS). The QS-21 can be initially in a lyophilized form before being dissolved in PBS.

In some embodiments, the immune cells can be human donor peripheral blood immune cells.

In some embodiments, the immune cells can be live T cells.

In some embodiments, the live T cells can be $CD4^+$ T cells.

In some embodiments, disclosed is a culture medium for activating and expanding immune cells in vitro comprising a *Quillaja* saponin.

In some embodiments, the *Quillaja* saponin can be derived from the inner bark or cortex of the *Quillaja* saponaria Molina tree.

In some embodiments, the culture medium can be a serum-free culture medium.

In some embodiments, the culture medium can be a T-cell expansion medium.

In some embodiments, the *Quillaja* saponin can be pre-mixed into the culture medium.

In some embodiments, the *Quillaja* saponin can be a purified *Quillaja* saponin.

In some embodiments, the purified *Quillaja* saponin can be QS-21.

In some embodiments, the immune cells can be human donor peripheral blood immune cells.

In some embodiments, the immune cells can be live T cells.

In some embodiments, the live T cells can be $CD4^+$ T cells.

In some embodiments, disclosed is a method of activating and expanding immune cells in vitro, comprising adding a *Quillaja* saponin to a population of immune cells.

In some embodiments, the method can further comprise activating the population of immune cells with an anti-CD3 and anti-CD28 T-cell activation reagent prior to adding the *Quillaja* saponin.

In some embodiments, the method can further comprise dissolving the *Quillaja* saponin in water prior to adding the *Quillaja* saponin to the population of immune cells. The *Quillaja* saponin can be initially in a lyophilized form.

In some embodiments, adding the *Quillaja* saponin can further comprise adding the *Quillaja* saponin to a culture medium comprising the population of immune cells.

In some embodiments, the *Quillaja* saponin can be derived from the inner bark or cortex of the *Quillaja* saponaria Molina tree.

In some embodiments, the *Quillaja* saponin can be a purified *Quillaja* saponin.

In some embodiments, the purified *Quillaja* saponin can be QS-21.

In some embodiments, the method can further comprise dissolving the QS-21 in phosphate buffered saline (PBS) prior to adding the QS-21 to the population of immune cells. The QS-21 can be initially in a lyophilized form.

In some embodiments, the immune cells can be human donor peripheral blood immune cells.

In some embodiments, the immune cells can be live T cells.

In some embodiments, the live T cells can be CD4$^+$ T cells.

In some embodiments, disclosed is a reagent kit for activating and expanding immune cells in vitro comprising a *Quillaja* saponin and an anti-CD3 and anti-CD28 T-cell activation reagent. The anti-CD3 and anti-CD28 T-cell activation reagent can comprise a plurality of self-assembling protein nanoparticles decorated with anti-CD3 antibodies and anti-CD28 antibodies. At least one of the self-assembling protein nanoparticles can comprise a protein cage polypeptide assembled into a three-dimensional structure and can serve as a scaffold for the anti-CD3 antibodies and the anti-CD28 antibodies.

In some embodiments, the three-dimensional structure can be a tetrahedral pyramid.

In some embodiments, the *Quillaja* saponin can be dissolved in water.

In some embodiments, the *Quillaja* saponin can be initially in a lyophilized form before being dissolved in water.

In some embodiments, the *Quillaja* saponin can be derived from the inner bark or cortex of the *Quillaja saponaria* Molina tree.

In some embodiments, the *Quillaja* saponin can be a purified *Quillaja* saponin.

In some embodiments, the purified *Quillaja* saponin can be QS-21.

In some embodiments, the QS-21 can be dissolved in phosphate buffered saline (PBS). The QS-21 can be initially in a lyophilized form before being dissolved in PBS.

In some embodiments, the immune cells can be human donor peripheral blood immune cells.

In some embodiments, the immune cells can be live T cells.

In some embodiments, the live T cells can be CD4$^+$ T cells.

In some embodiments, disclosed is a reagent for activating and expanding immune cells in vitro comprising DL-α-tocopherol, squalene oil, and a nonionic surfactant.

In some embodiments, the DL-α-tocopherol, the squalene oil, and the nonionic surfactant can be combined in an aqueous solution.

In some embodiments, the DL-α-tocopherol can be present in an amount from 3% to 7% (v/v). The squalene oil can be present in an amount from 3% to 7% (v/v). The nonionic surfactant can be present in an amount from 1% to 2.5% (v/v).

In some embodiments, the DL-α-tocopherol can be present in an amount from 0.50% to 4.0% (w/v). The squalene oil can be present in an amount from 0.50% to 4.0% (w/v). The nonionic surfactant can be present in an amount from 0.20% to 2.0% (w/v).

In some embodiments, the nonionic surfactant can be polysorbate 80.

In some embodiments, the immune cells can be human donor peripheral blood immune cells.

In some embodiments, the immune cells can be live T cells.

In some embodiments, the live T cells can be CD4$^+$ T cells.

In some embodiments, the live T cells can be CD8$^+$ T cells.

In some embodiments, disclosed is a culture medium for activating and expanding immune cells in vitro comprising a squalene-based emulsion. The squalene-based emulsion can comprise DL-α-tocopherol, squalene oil, and a nonionic surfactant.

In some embodiments, the culture medium can be a serum-free culture medium.

In some embodiments, the culture medium can be a T-cell expansion medium.

In some embodiments, the squalene-based emulsion can be pre-mixed into the culture medium.

In some embodiments, the immune cells can be human donor peripheral blood immune cells.

In some embodiments, the immune cells can be live T cells.

In some embodiments, the live T cells can be CD4$^+$ T cells.

In some embodiments, the live T cells can be CD8$^+$ T cells.

In some embodiments, disclosed is a method of activating and expanding immune cells in vitro comprising adding an aqueous solution to a population of immune cells. The aqueous solution can comprise DL-α-tocopherol, squalene oil, and a nonionic surfactant.

In some embodiments, the method can further comprise activating the population of immune cells with an anti-CD3 activation reagent and an anti-CD28 activation reagent prior to adding the aqueous solution.

In some embodiments, the DL-α-tocopherol can be present in an amount from 3% to 7% (v/v). The squalene oil can be present in an amount from 3% to 7% (v/v). The nonionic surfactant can be present in an amount from 1% to 2.5% (v/v).

In some embodiments, the DL-α-tocopherol can be present in an amount from 0.50% to 4.0% (w/v). The squalene oil can be present in an amount from 0.50% to 4.0% (w/v). The nonionic surfactant can be present in an amount from 0.20% to 2.0% (w/v).

In some embodiments, the method can further comprise adding the aqueous solution comprising the DL-α-tocopherol, the squalene oil, and the nonionic surfactant to a culture medium comprising the population of immune cells.

In some embodiments, the immune cells can be human donor peripheral blood immune cells.

In some embodiments, the immune cells can be live T cells.

In some embodiments, the live T cells can be CD4$^+$ T cells.

In some embodiments, the live T cells can be CD8$^+$ T cells.

In some embodiments, disclosed is a reagent kit for activating and expanding immune cells in vitro comprising an aqueous solution comprising DL-α-tocopherol, squalene oil, and a nonionic surfactant, and an anti-CD3 and anti-CD28 T-cell activation reagent. The anti-CD3 and anti-CD28 T-cell activation reagent can comprise a plurality of self-assembling protein nanoparticles decorated with anti-CD3 antibodies and anti-CD28 antibodies. At least one of the self-assembling protein nanoparticles can comprise a protein cage polypeptide assembled into a three-dimensional structure and can serve as a scaffold for the anti-CD3 antibodies and the anti-CD28 antibodies.

In some embodiments, the three-dimensional structure can be a tetrahedral pyramid.

In some embodiments, the DL-α-tocopherol can be present in an amount from 3% to 7% (v/v). The squalene oil can be present in an amount from 3% to 7% (v/v). The nonionic surfactant can be present in an amount from 1% to 2.5% (v/v).

In some embodiments, the DL-α-tocopherol can be present in an amount from 0.50% to 4.0% (w/v). The squalene oil can be present in an amount from 0.50% to 4.0% (w/v). The nonionic surfactant can be present in an amount from 0.20% to 2.0% (w/v).

In some embodiments, the nonionic surfactant can be polysorbate 80.

In some embodiments, the immune cells can be human donor peripheral blood immune cells.

In some embodiments, the immune cells can be live T cells.

In some embodiments, the live T cells can be CD4$^+$ T cells.

In some embodiments, the live T cells can be CD8$^+$ T cells.

DETAILED DESCRIPTION

Figure 1A:
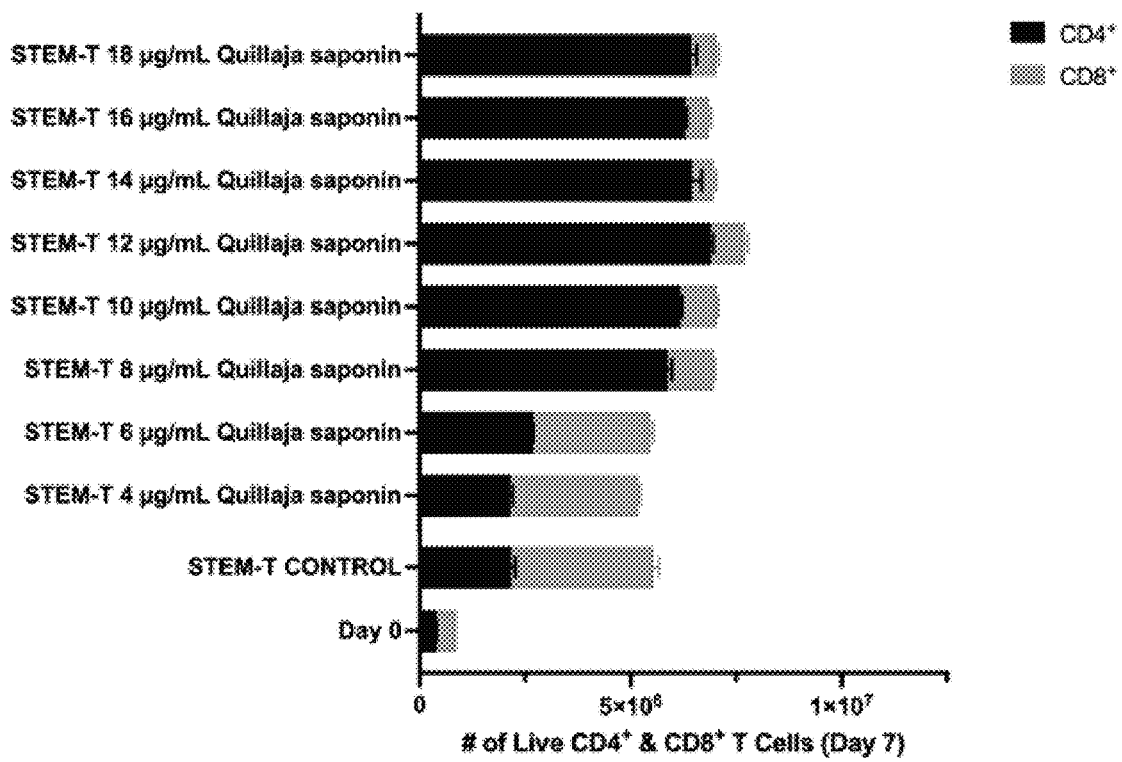
FIGS. 1A and 1B are stacked bar graphs illustrating the population of live T cells (CD4$^+$ T cells and CD8$^+$ T cells) determined using flow cytometry on days 7 and 10, respectively. Quillaja saponins were added to the population of live T cells at the concentrations shown. A STEM-T activated population of live T cells without Quillaja saponins served as the control.

Disclosed herein are reagents, reagent kits, and culture media for activating and expanding immune cells in vitro. Also disclosed are methods for activating and expanding immune cells in vitro using such reagents, reagent kits, and culture media. The reagents, reagent kits, culture media, and methods disclosed herein can be used as part of a protocol or procedure for manufacturing cell-based immunotherapies.

In some embodiments, a reagent or additive for activating and expanding immune cells in vitro can comprise a Quillaja saponin. The Quillaja saponin can be derived from the inner bark or cortex of the Quillaja saponaria Molina tree. For example, the Quillaja saponin can be a water-extractable fraction of saponins from the Quillaja saponaria Molina tree.

In some embodiments, the Quillaja saponin can be dissolved in water. For example, the Quillaja saponin can be initially in a lyophilized form before being dissolved in water.

In some embodiments, the Quillaja saponin can be a purified Quillaja saponin such as QS-21. The QS-21 can initially be in a lyophilized form and then dissolved in phosphate buffered saline (PBS).

The Quillaja saponin can have a molecular formula of $C_{92}H_{148}O_{46}$. The Quillaja saponin can have a molecular weight of about 1990.1 g/mol.

The Quillaja saponin can have the IUPAC name: (2S,3S, 4S,5R,6R)-6-[[(3S,4S,4aR,6aR,6bS,8R,8aR,12aS,14aR, 14bR)-8a-[(2S,3R,4S,5R,6R)-3-[(2S,3R,4S,5R,6S)-5-[(2S, 3R,4S,5R)-4-[(2S,3R,4R)-3,4-dihydroxy-4-(hydroxymethyl)oxolan-2-yl]oxy-3,5-dihydroxyoxan-2-yl]oxy-3,4-dihydroxy-6-methyloxan-2-yl]oxy-5-[(3S,5S,6S)-5-[(3S,5S, 6S)-5-[(2R,3R,4R,5S)-3,4-dihydroxy-5-(hydroxymethyl) oxolan-2-yl]oxy-3-hydroxy-6-methyloctanoyl]oxy-3-hydroxy-6-methyloctanoyl]oxy-4-hydroxy-6-methyloxan-2-yl]oxycarbonyl-4-formyl-8-hydroxy-4,6a,6b,11,11,14b-hexamethyl-1,2,3,4a,5,6,7,8,9,10,12,12a,14,14a-tetradecahydropicen-3-yl]oxy]-3-hydroxy-5-[(2S,3R,4S,5R,6R)-3, 4,5-trihydroxy-6-(hydroxymethyl)oxan-2-yl]oxy-4-[(2S, 3R,4S,5R)-3,4,5-trihydroxyoxan-2-yl]oxyoxane-2-carboxylic acid.

The immune cells activated and expanded can be human donor peripheral blood immune cells. In some embodiments, the immune cells can be live T cells.

As will be discussed in more detail in the following sections, Applicant discovered that adding reagents or additives comprising Quillaja saponin to immune cells (e.g., T cells) can significantly increase the population of CD4$^+$ T cells and change the composition of T cells such that the percentage of CD4$^+$ T cells is greatly increased (see FIGS. 1A-1B, 2A-2B, 3A-3B, and 4A-4B).

Also disclosed is a reagent kit for activating and expanding immune cells in vitro. The reagent kit can comprise a reagent or additive comprising a Quillaja saponin or a purified Quillaja saponin (e.g., QS-21) and an anti-CD3 and anti-CD28 T-cell activation reagent.

In certain embodiments, the anti-CD3 and anti-CD28 T-cell activation reagent can comprise a plurality of self-assembling protein nanoparticles decorated with anti-CD3 antibodies and anti-CD28 antibodies. The self-assembling protein nanoparticles can comprise protein cage polypeptides assembled into three-dimensional structures.

In some embodiments, the three-dimensional structure of the protein cage polypeptide can be a tetrahedral pyramid. The protein cage polypeptides can also self-assemble into compact asymmetrical multimeric structures or cage-cage multimers (including dimers).

The three-dimensional structures (e.g., protein cage polypeptide formed into tetrahedral pyramids) can serve as scaffolds for the anti-CD3 antibodies and the anti-CD28 antibodies.

The protein cage polypeptide can be any of the protein cage polypeptides or scaffolding proteins discussed in U.S. Patent Publication No. 2022/0196655, the content of which is incorporated herein by reference in its entirety.

In some embodiments, the protein cage polypeptide can be comprised of a polypeptide comprising an amino acid sequence with at least about 70%, 75%, 80%, 85%, 90%, 95%, 99%, or 100% amino acid identity to the amino acid sequence set forth in any one of SEQ ID NOS: 1-3 (see Table 1).

TABLE 1

Sequences of protein cage polypeptides designed and experimentally tested to-date

| SEQ ID NO: | NAME | SEQUENCE |
|---|---|---|
| 1 | Protein cage polypeptide 1 | MPFITVGQENSTSIDLYYEDHGTGTPVVLIHGFPLSGHSW RQSAALLDAGYRVITYDRRGFGQSSQPTTGYDYDTFAADE LNTVLETLDLQDAVLVGFSMGTGEVARYVSSYGTARIAAV AFLASLEPFLLKTDDNPDGAAPQEFFDGIVAAVKADRYAF YTGFFNDFYNLDENLGTRISEEAVRNSWNTAASGGFFAAA AAPTTWYTDFRADIPRIDVPALILHGTGDRTLPIENTARV FHKALPSAEYVEVEGAPHGLLWTHAEEVNTALLAFLAKAQ EAQKQKLLTEVETYVLSIIPSGPLKAEIAQRLEDVFAGRW GSGADCAWHLGELVWCTAGSGWEDLEVLMEWLKTRPILSP LTKGILGFVFTLTVPSERGLQRRRFVQNALNGNGDPNNMD KAVKLYRKLKREITFHGAKEISLSYSAGALASCMGLIYNR MGAVTTEVAFGLVCATCEQIADSQHRSHRQLEHHHHHH |
| 2 | Protein cage polypeptide 2 | MPFITVGQENSTSIDLYYEDHGTGTPVVLIHGFPLSGHSW ERQSAALLDAGYRVITYDRRGFGQSSQPTTGYDYDTFAAD LNTVLETLDLQDAVLVGFSMGTGEVARYVSSYGTARIAAV AFLASLEPFLLKTDDNPDGAAPQEFFDGIVAAVKADRYAF YTGFFNDFYNLDENLGTRISEEAVRNSWNTAASGGFFAAA AAPTTWYTDFRADIPRIDVPALILHGTGDRTLPIENTARV FHKALPSAEYVEVEGAPHGLLWTHAEEVNTALLAFLAKAQ EAQKQKLLTEVETYVLSIIPSGPLKAEIAQRLEDVFAGGG RWGADCAWHLGELVWCTAGWEGGDLEVLMEWLKTRPILSP LTKGILGFVFTLTVPSERGLQRRRFVQNALNGNGDPNNMD KAVKLYRKLKREITFHGAKEISLSYSAGALASCMGLIYNR MGAVTTEVAFGLVCATCEQIADSQHRSHRQLEHHHHHH |
| 3 | Protein cage polypeptide 3 | MPFITVGQENSTSIDLYYEDHGTGTPVVLIHGFPLSGHSW ERQSAALLDAGYRVITYDRRGFGQSSQPTTGYDYDTFAAD LNTVLETLDLQDAVLVGFSMGTGEVARYVSSYGTARIAAV AFLASLEPFLLKTDDNPDGAAPQEFFDGIVAAVKADRYAF YTGFFNDFYNLDENLGTRISEEAVRNSWNTAASGGFFAAA AAPTTWYTDFRADIPRIDVPALILHGTGDRTLPIENTARV FHKALPSAEYVEVEGAPHGLLWTHAEEVNTALLAFLAKAQ EAQKQKLLTEVETYVLSIIPSGPLKAEIAQRLEDVFAGGA DCAWHLGELVWCTAGDLEVLMEWLKTRPILSPLTKGILGF VFTLTVPSERGLQRRRFVQNALNGNGDPNNMDKAVKLYRK LKREITFHGAKEISLSYSAGALASCMGLIYNRMGAVTTEV AFGLVCATCEQIADSQHRSHRQLEHHHHHH |

The protein cage polypeptide can comprise a polypeptide of about 400 to about 700 amino acid residues in length. In some embodiments, the protein cage polypeptide can comprise a polypeptide of about 450 amino acid residues to about 650 amino acid residues in length.

Also disclosed is a culture medium for activating and expanding immune cells in vitro, comprising a *Quillaja* saponin or QS-21.

In some embodiments, the culture medium can be a T-cell expansion medium. For example, the culture medium can comprise, in addition to the *Quillaja* saponin or the QS-21, sodium bicarbonate (NaHCO$_3$) as a buffer, a visual pH indicator, one or more proteins, supplemental amino acids, carbohydrates, lipids, inorganic salts, enzyme cofactors, vitamins, and (optionally) a zwitterion that can act as an additional buffer.

In certain embodiments, the visual pH indicator can be Phenol Red. The one or more proteins can comprise at least one of albumin, transferrin, fibronectin, and insulin. The supplemental amino acids (e.g., glutamine) can replace those depleted during the cells' growth phase. The carbohydrates can comprise glucose, galactose, maltose, and/or fructose. The lipids or fatty acids can be used by the cells for cell membrane synthesis and activate important signaling pathways. The inorganic salts in the medium (e.g., sodium, potassium, and calcium) can help maintain osmotic balance and regulate membrane potential. The enzyme cofactors can comprise at least one of zinc, copper, selenium, and tricarboxylic acid. The vitamins can comprise riboflavin, thiamine, and/or biotin.

In some embodiments, the culture medium can be a serum-free culture medium. For example, the serum-free culture medium does not contain serum or plasma (although it may contain components derived from serum or plasma such as bovine serum albumin).

In other embodiments, the culture medium can comprise serum or plasma such as fetal bovine serum (FBS).

In some embodiments, the *Quillaja* saponin or the QS-21 can be pre-mixed into the culture medium.

In some embodiments, a method of activating and expanding immune cells in vitro can comprise adding the *Quillaja* saponin or the QS-21 to a population of immune cells.

The method can further comprise dissolving the *Quillaja* saponin in water prior to adding the *Quillaja* saponin to the population of immune cells. The *Quillaja* saponin can initially be in a lyophilized form.

The method can also comprise dissolving the QS-21 in phosphate buffered saline (PBS) prior to adding the QS-21 to the population of immune cells. The QS-21 can initially be in a lyophilized form.

In some embodiments, the immune cells can be human donor peripheral blood immune cells. For example, the immune cells can be live T cells. As a more specific example, the live T cells activated and expanded can comprise $CD4^+$ T cells.

The method can further comprise activating the population of immune cells with an anti-CD3 and anti-CD28 T-cell activation reagent prior to adding the *Quillaja* saponin or the QS-21. The T cells can start off as purified $CD3^+$ T cells that are activated artificially outside of the body using the anti-CD3 and anti-CD28 T-cell activation reagent.

The anti-CD3 and anti-CD28 T-cell activation reagent can comprise a plurality of self-assembling protein nanoparticles decorated with anti-CD3 antibodies and anti-CD28 antibodies.

In some embodiments, the anti-CD3 antibodies can be the "OKT3" clone with multiple host isotypes, such as human, mouse, rabbit, etc. For example, any of the following anti-CD3 antibodies can be used: (i) anti-CD3 monoclonal antibodies (OKT3) distributed by Takara Bio, (ii) GMP monoclonal anti-human CD3 antibodies (OKT3) distributed by ACROBiosystems, (iii) MACS® GMP CD3 pure antibodies distributed by Miltenyi Biotec, or (iv) GMP Ultra-LEAF™ purified anti-human CD3 SF antibodies distributed by BioLegend.

In some embodiments, the anti-CD28 antibodies can be agonist clones with multiple host isotypes, such as human, mouse, rabbit, etc. For example, any of the following anti-CD28 antibodies can be used: (i) anti-CD28 [YTH 913.12] antibodies distributed by Absolute Antibody, (ii) CD28 antibodies, anti-human, clone 15E8 distributed by Miltenyi Biotec, (iii) Ultra-LEAF™ purified anti-human CD28 antibodies, clone cd28.2, distributed by BioLegend, or (iv) BD™ purified mouse anti-human CD28 antibodies, clone L293, distributed by BD Biosciences.

In some embodiments, a reagent or additive for activating and expanding immune cells in vitro can comprise a squalene-based emulsion. The squalene-based emulsion can comprise DL-α-tocopherol; squalene oil; and a nonionic surfactant.

The DL-α-tocopherol, the squalene oil, and the nonionic surfactant can be combined in an aqueous solution to form the squalene-based emulsion.

In some embodiments, the DL-α-tocopherol is present in an amount from 3% to 7% (v/v), the squalene oil is present in an amount from 3% to 7% (v/v), and the nonionic surfactant is present in an amount from 1% to 2.5% (v/v).

In other embodiments, the DL-α-tocopherol is present in an amount from 0.50% to 4.0% (w/v), the squalene oil is present in an amount from 0.50% to 4.0% (w/v), and the nonionic surfactant is present in an amount from 0.20% to 2.0% (w/v).

Below are three example formulations for the squalene-based emulsion:

| Composition 1: | |
|---|---|
| Component: | Amount: |
| DL-α-tocopherol | 5.0% (v/v) |
| squalene oil | 5.0% (v/v) |
| nonionic surfactant (e.g., Polysorbate 80) | 1.8% (v/v) |

| Composition 2: | |
|---|---|
| Component: | Amount: |
| DL-α-tocopherol | 2.4% (w/v) |
| squalene oil | 2.2% (w/v) |
| nonionic surfactant (e.g., Polysorbate 80) | 0.97% (w/v) |

| Composition 3: | |
|---|---|
| Component: | Amount: |
| DL-α-tocopherol | 1.2% (w/v) |
| squalene oil | 1.1% (w/v) |
| nonionic surfactant (e.g., Polysorbate 80) | 0.49% (w/v) |

In some embodiments, the nonionic surfactant is Polysorbate 80.

The immune cells activated and expanded can be human donor peripheral blood immune cells. In some embodiments, the immune cells can be live T cells.

As will be discussed in more detail in the following sections, Applicant discovered that adding reagents or additives comprising the squalene-based emulsion to immune cells (e.g., T cells) can significantly increase the population of $CD4^+$ T cells and $CD8^+$ T cells in a dose dependent manner. Moreover, the reagent or additive comprising the squalene-based emulsion (e.g., any of Compositions 1-3) can significantly change the composition of T cells such that the percentage of $CD4^+$ T cells and/or the percentage of $CD8^+$ T cells are greatly increased (see FIGS. 5A-5B and 6A-6B).

Also disclosed is a reagent kit for activating and expanding immune cells in vitro. The reagent kit can comprise a reagent or additive comprising the squalene-based emulsion (e.g., any of Compositions 1-3) and the anti-CD3 and anti-CD28 T-cell activation reagent.

As previously discussed, the anti-CD3 and anti-CD28 T-cell activation reagent can comprise a plurality of self-assembling protein nanoparticles decorated with anti-CD3 antibodies and anti-CD28 antibodies. The self-assembling protein nanoparticles can comprise protein cage polypeptides assembled into three-dimensional structures (e.g., tetrahedral pyramids).

In some embodiments, the anti-CD3 antibodies can be the "OKT3" clone with multiple host isotypes, such as human, mouse, rabbit, etc. For example, any of the following anti-CD3 antibodies can be used: (i) anti-CD3 monoclonal antibodies (OKT3) distributed by Takara Bio, (ii) GMP monoclonal anti-human CD3 antibodies (OKT3) distributed by ACROBiosystems, (iii) MACS® GMP CD3 pure antibodies distributed by Miltenyi Biotec, or (iv) GMP Ultra-LEAF™ purified anti-human CD3 SF antibodies distributed by BioLegend.

In some embodiments, the anti-CD28 antibodies can be agonist clones with multiple host isotypes, such as human, mouse, rabbit, etc. For example, any of the following anti-CD28 antibodies can be used: (i) anti-CD28 [YTH 913.12] antibodies distributed by Absolute Antibody, (ii) CD28 antibodies, anti-human, clone 15E8 distributed by Miltenyi Biotec, (iii) Ultra-LEAF™ purified anti-human CD28 antibodies, clone cd28.2, distributed by BioLegend, or (iv) BD™ purified mouse anti-human CD28 antibodies, clone L293, distributed by BD Biosciences.

Also disclosed is a culture medium for activating and expanding immune cells in vitro, comprising the squalene-based emulsion.

In some embodiments, the culture medium can be a T-cell expansion medium. For example, the culture medium can comprise, in addition to the squalene-based emulsion, sodium bicarbonate ($NaHCO_3$) as a buffer, a visual pH indicator, one or more proteins, supplemental amino acids, carbohydrates, lipids, inorganic salts, enzyme cofactors, vitamins, and (optionally) a zwitterion that can act as an additional buffer.

In certain embodiments, the visual pH indicator can be Phenol Red. The one or more proteins can comprise at least one of albumin, transferrin, fibronectin, and insulin. The supplemental amino acids (e.g., glutamine) can replace those depleted during the cells' growth phase. The carbohydrates can comprise glucose, galactose, maltose, and/or fructose. The lipids or fatty acids can be used by the cells for cell membrane synthesis and activate important signaling pathways. The inorganic salts in the medium (e.g., sodium, potassium, and calcium) can help maintain osmotic balance and regulate membrane potential. The enzyme cofactors can comprise at least one of zinc, copper, selenium, and tricarboxylic acid. The vitamins can comprise riboflavin, thiamine, and/or biotin.

In some embodiments, the culture medium can be a serum-free culture medium. For example, the serum-free culture medium does not contain serum or plasma (although it may contain components derived from serum or plasma such as bovine serum albumin).

In other embodiments, the culture medium can comprise serum or plasma such as fetal bovine serum (FBS).

In some embodiments, the squalene-based emulsion can be pre-mixed into the culture medium.

In some embodiments, a method of activating and expanding immune cells in vitro can comprise adding an aqueous solution comprising DL-α-tocopherol, squalene oil, and a nonionic surfactant (e.g., any of Compositions 1-3) to a population of immune cells.

In some embodiments, the immune cells can be human donor peripheral blood immune cells. For example, the immune cells can be live T cells. As a more specific example, the live T cells activated and expanded can comprise $CD4^+$ T cells and CD8+ T cells.

The method can further comprise comprising activating the population of immune cells with the anti-CD3 and anti-CD28 T-cell activation reagent prior to adding the aqueous solution comprising the DL-α-tocopherol, squalene oil, and nonionic surfactant (the squalene-based emulsion). The T cells can start off as purified $CD3^+$ T cells that are activated artificially outside of the body using the anti-CD3 and anti-CD28 T-cell activation reagent.

EXAMPLES

The examples below are given so as to illustrate the practice of various embodiments of the present disclosure. They are not intended to limit or define the entire scope of this disclosure. It should be appreciated that the disclosure is not limited to the particular embodiments described and illustrated herein but includes all modifications and variations falling within the scope of the disclosure as defined in the appended embodiments.

Example 1: *Quillaja* Saponins Enhance T-Cell Activation and Expansion in Vitro

One unexpected result stemming from the experiments disclosed herein is that *Quillaja* saponins can increase T-cell activation and expansion in vitro when compared to T-cell activation with a T-cell activation reagent alone.

Human peripheral blood $CD3^+$ T cells were thawed and media exchanged in serum free T-cell expansion medium on day 0. T cells were seeded at a concentration of $1 \times 10^6$ cells/mL then placed in a 37° C. and 5% $CO_2$ incubator for approximately 4 hours. The T cells were then activated with an anti-CD3 and anti-CD28 T-cell activation reagent. The T-cell activation reagent is referred to herein and shown in the figures as STEM-T.

The STEM-T activation reagent comprises a plurality of self-assembling protein nanoparticles decorated with anti-CD3 antibodies and anti-CD28 antibodies. The self-assembling protein nanoparticles comprise protein cage polypeptides assembled into three-dimensional structures. Each of the three-dimensional structures can serve as a scaffold for the anti-CD3 antibodies and the anti-CD28 antibodies.

In some embodiments, the three-dimensional structure formed by the protein cage polypeptide can be a tetrahedral pyramid. The protein cage polypeptides can also self-assemble into compact asymmetrical multimeric structures or cage-cage multimers (including dimers).

Different concentrations of a *Quillaja* saponin and a purified *Quillaja* saponin, QS-21, were added to the population of live T cells after activating the live T cells with STEM-T. A STEM-T activated population of live T cells without saponins served as the control. Cytokines (e.g., IL-7 and IL-15) were then added to the medium and then returned to the 37° C. and 5% $CO_2$ incubator. For example, IL-7 and IL-15 were added to a final concentration of 10 ng/ml. The media was exchanged every ~3 days with fresh media supplemented with cytokines.

Figure 1B:
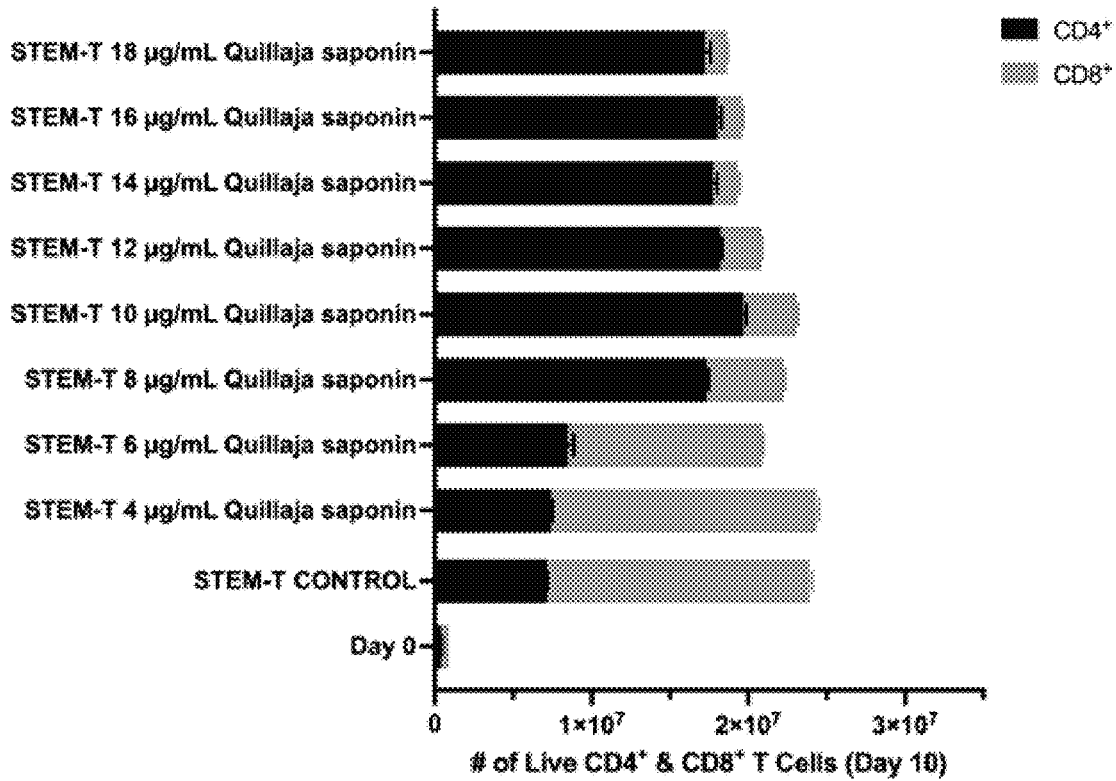

FIGS. 1A and 1B are stacked bar graphs illustrating the population of live T cells ($CD4^+$ T cells and $CD8^+$ T cells) determined using flow cytometry on days 7 and 10, respectively. *Quillaja* saponins were added to the population of live T cells shown in FIGS. 1A and 1B at the following concentrations after activating the live T cells with STEM-T: 4 μg/mL, 6 μg/mL, 8 μg/mL, 10 μg/mL, 12 μg/mL, 14 μg/mL, 16 μg/mL, and 18 μg/mL (where the concentrations refer to μg of *Quillaja* saponins per mL of culture medium). The *Quillaja* saponin used was Quil-AR saponin distributed by InvivoGen.

For example, the Quil-AR saponin initially started off as a lyophilized powder. The saponin powder was dissolved in deionized water to a working stock concentration of 10 mg/mL. The working stock concentration was then diluted to the aforementioned concentrations by being added into the culture medium (e.g., T-cell expansion medium).

Figure 2A:
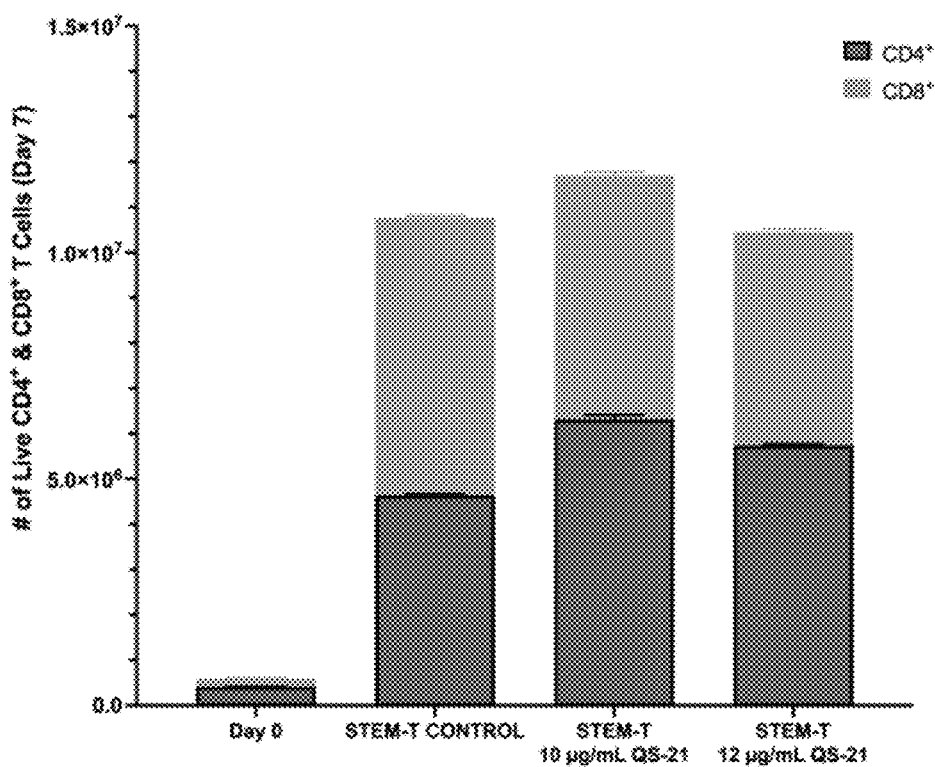
FIGS. 2A and 2B are stacked bar graphs illustrating the population of live T cells (CD4$^+$ T cells and CD8$^+$ T cells) determined using flow cytometry on days 7 and 10, respectively. QS-21 was added to the population of live T cells at the concentrations shown. A STEM-T activated population of live T cells without QS-21 served as the control.
Figure 2B:
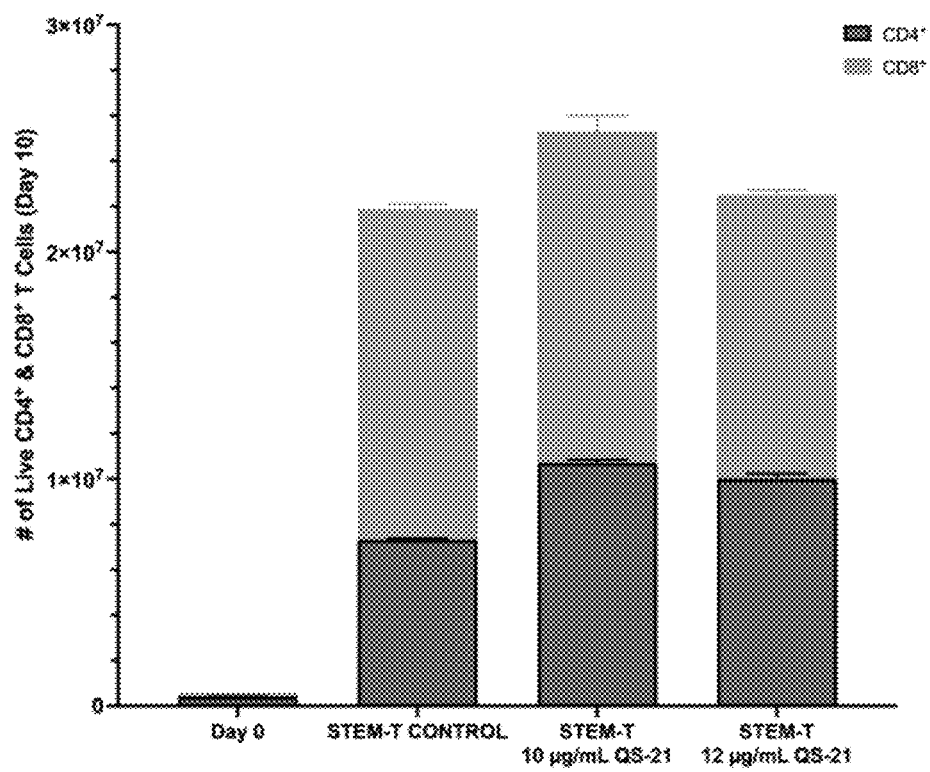

FIGS. 2A and 2B are stacked bar graphs illustrating the population of live T cells ($CD4^+$ T cells and $CD8^+$ T cells) determined using flow cytometry on days 7 and 10, respectively. QS-21 was added to the population of live T cells shown in FIGS. 2A and 2B at concentrations of 10 μg/mL and 12 μg/mL (where the concentrations refer to μg of QS-21 per mL of culture medium) after activating the live T cells with STEM-T. The QS-21 used was distributed by MedChemExpress.

For example, the QS-21 initially started off as a lyophilized film. The lyophilized film was dissolved in phosphate buffered saline (PBS) to a working stock concentration of 5 mg/mL. The working stock concentration was then diluted to the aforementioned concentrations by being added into the culture medium (e.g., T-cell expansion medium).

As can be seen from FIGS. 1A-1B and 2A-2B, the total number of live T cells (CD4+ T cells and CD8+ T cells combined) increased when compared to the STEM-T control in response to the addition of 10 µg/mL of QS-21 (as measured on days 7 and 10) and the addition of at least 8 µg/mL of the *Quillaja* saponin (as measured on day 7).

Moreover, another unexpected result stemming from the experiments disclosed herein is that the number of live CD4+ T cells increased significantly when compared to the STEM-T control in response to the addition of at least 8 µg/mL of *Quillaja* saponin and the addition of 10 µg/mL of QS-21 (as measured on days 7 and 10).

Furthermore, yet another unexpected result stemming from the experiments disclosed herein is that *Quillaja* saponins, including purified *Quillaja* saponins (e.g., QS-21), at concentrations between 10 µg/mL and 12 µg/mL of media enhanced T-cell expansion compared to activated controls.

For example, QS-21 can be purified using reverse-phase chromatography (RP-HPLC). QS denotes *Quillaja saponaria* and the number 21 is the identity of the RP-HPLC peak [7]. Methods for purifying QS-21 from the inner bark or cortex of the *Quillaja saponaria* Molina tree using silica and RP-HPLC are known in the art [8].

Example 2: *Quillaja* Saponins Change the Composition of T Cells Expanded in Vitro One unexpected result stemming from the experiments disclosed herein is that *Quillaja* saponins can change the composition of T cells such that the percentage of CD4+ T cells is greatly increased.

Flow cytometry was also used to determine the percentage of CD4+ T cells relative to CD8+ T cells for the T cells expanded using the method discussed in Example 1.

Figure 3A:
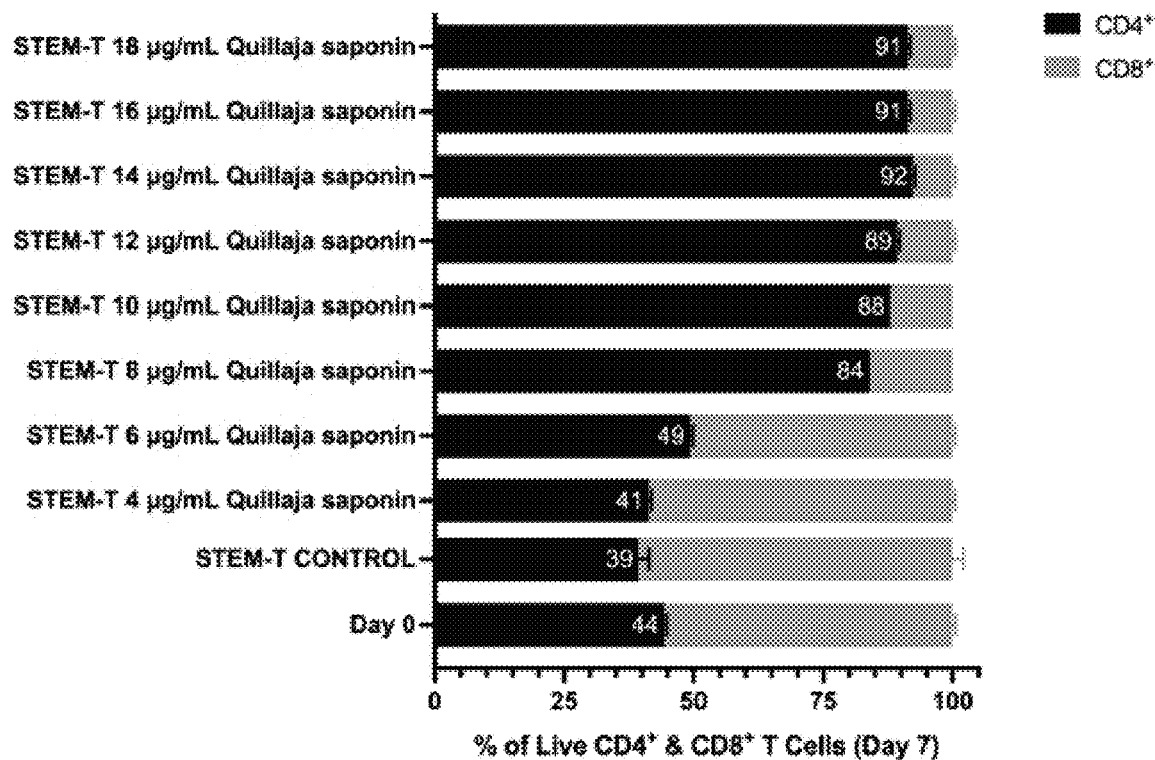
FIGS. 3A and 3B are stacked bar graphs illustrating the percentage of CD4+ T cells relative to CD8$^+$ T cells as determined using flow cytometry on days 7 and 10, respectively. Quillaja saponins were added to the population of live T cells at the concentrations shown. A STEM-T activated population of live T cells without Quillaja saponins served as the control.
Figure 3B:
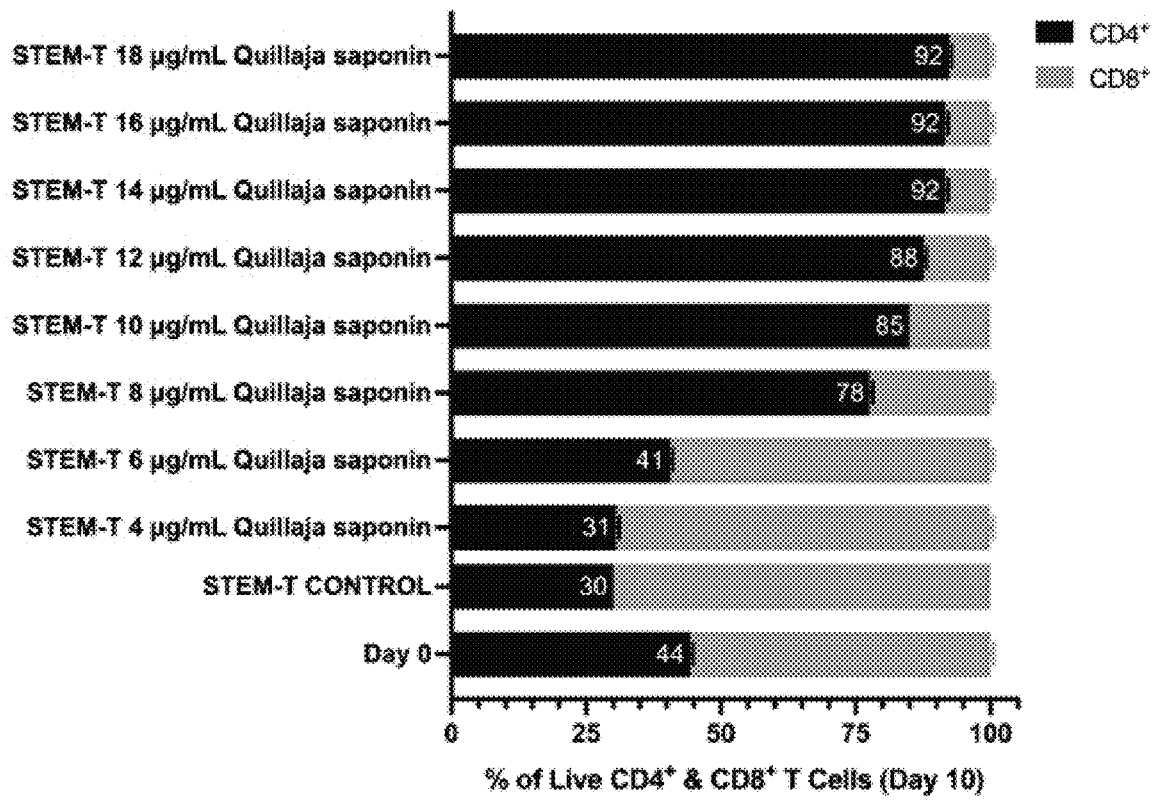

FIGS. 3A and 3B are stacked bar graphs illustrating the percentage of CD4+ T cells relative to CD8+ T cells as determined using flow cytometry on days 7 and 10, respectively. *Quillaja* saponins were added to the population of live T cells shown in FIGS. 3A and 3B at the following concentrations after activating the live T cells with STEM-T: 4 µg/mL, 6 µg/mL, 8 µg/mL, 10 µg/mL, 12 µg/mL, 14 µg/mL, 16 µg/mL, and 18 µg/mL. The *Quillaja* saponin used was Quil-A® saponin distributed by InvivoGen.

Figure 4A:
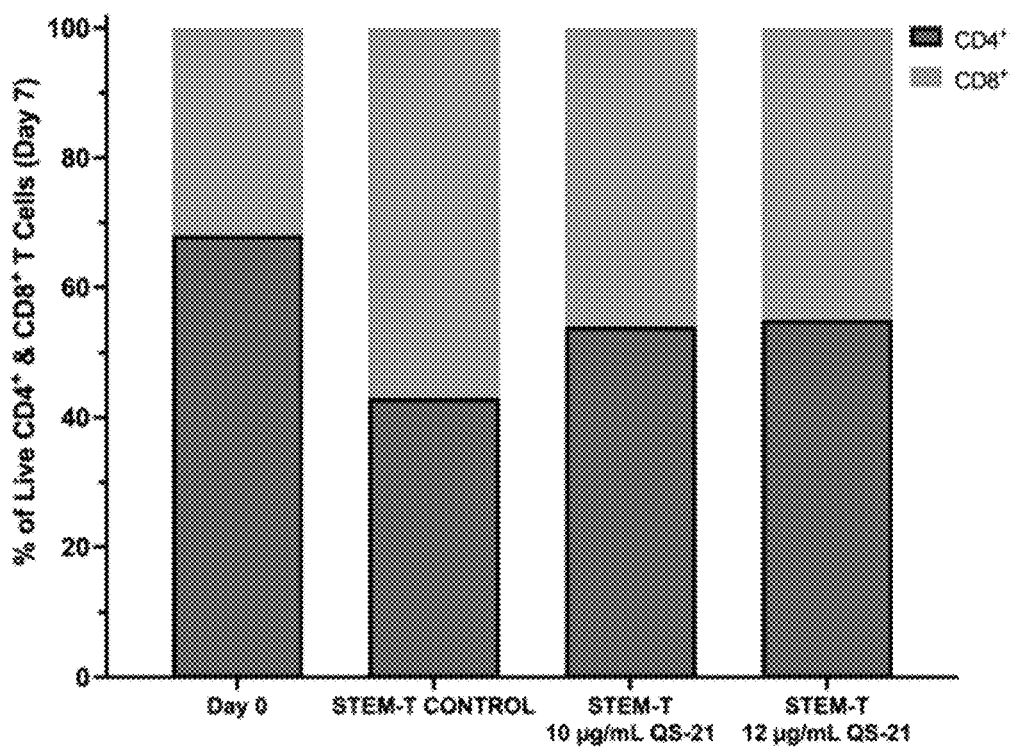
FIGS. 4A and 4B are stacked bar graphs illustrating the percentage of CD4$^+$ T cells relative to CD8$^+$ T cells as determined using flow cytometry on days 7 and 10, respectively. QS-21 was added to the population of live T cells at the concentrations shown. A STEM-T activated population of live T cells without QS-21 served as the control.
Figure 4B:
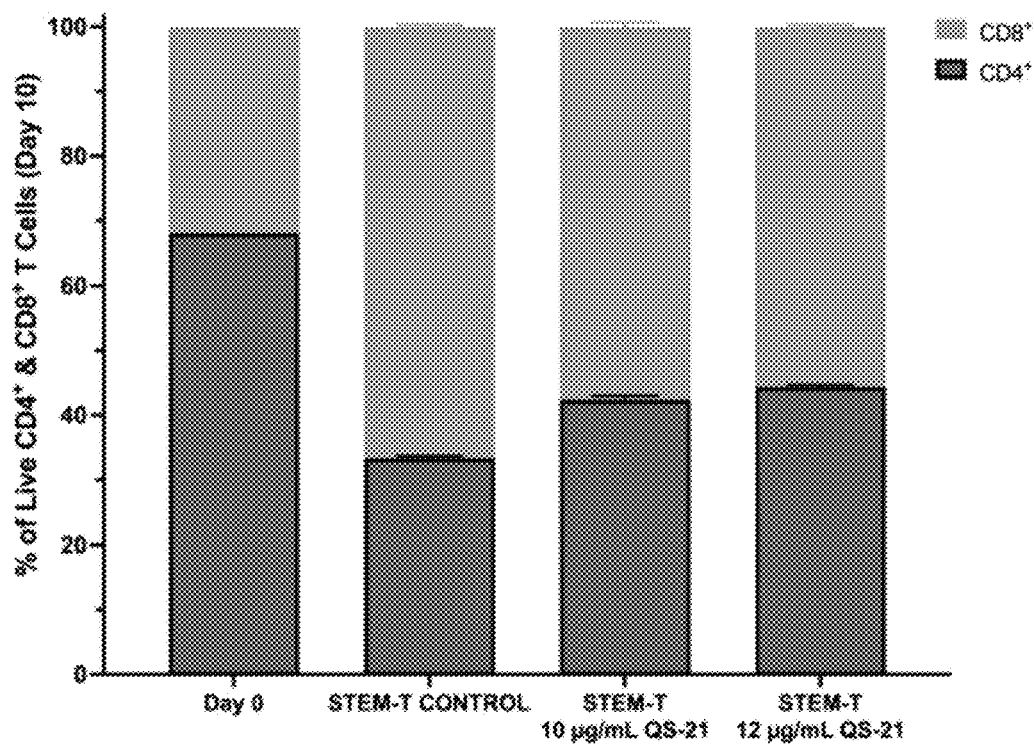

FIGS. 4A and 4B are stacked bar graphs illustrating the percentage of CD4+ T cells relative to CD8+ T cells as determined using flow cytometry on days 7 and 10, respectively. QS-21 was added to the population of live T cells shown in FIGS. 4A and 4B at concentrations of 10 µg/mL and 12 µg/mL after activating the live T cells with STEM-T. The QS-21 used was distributed by MedChemExpress.

In studies, QS-21 has been shown to induce a combination of a Th1 (cell-mediated immunity including phagocyte-dependent response) and Th2 (antibody production and eosinophil activation) immune response [9].

As can be seen from FIGS. 3A-3B, the percentage of CD4+ T cells relative to CD8+ T cells increased significantly when compared to the STEM-T control in response to the addition of at least 8 µg/mL of *Quillaja* saponin (as measured on days 7 and 10).

Moreover, as can be seen from FIGS. 4A-4B, the percentage of CD4+ T cells relative to CD8+ T cells increased when compared to the STEM-T control in response to the addition of at least 10 µg/mL of QS-21.

Example 3: Squalene-Based Emulsions Enhance T-Cell Activation and Expansion in Vitro One unexpected result stemming from the experiments disclosed herein is that squalene-based emulsions can increase T-cell activation and expansion in vitro when compared to T-cell activation with a T-cell activation reagent alone.

Human peripheral blood CD3+ T cells were thawed and media exchanged in serum free T-cell expansion medium on day 0. T cells were seeded at a concentration of $1\times10^6$ cells/mL then placed in a 37° C. and 5% $CO_2$ incubator for approximately 4 hours. The T cells were then activated with an anti-CD3 and anti-CD28 T-cell activation reagent. The T-cell activation reagent is referred to herein and shown in the figures as STEM-T.

Different concentrations of a squalene-based emulsion were added to the population of live T cells after activating the live T cells with STEM-T. A STEM-T activated population of live T cells without the squalene-based emulsion served as the control.

In some embodiments, the anti-CD3 antibodies can be the "OKT3" clone with multiple host isotypes, such as human, mouse, rabbit, etc. For example, any of the following anti-CD3 antibodies can be used: (i) anti-CD3 monoclonal antibodies (OKT3) distributed by Takara Bio, (ii) GMP monoclonal anti-human CD3 antibodies (OKT3) distributed by ACROBiosystems, (iii) MACS® GMP CD3 pure antibodies distributed by Miltenyi Biotec, or (iv) GMP Ultra-LEAF™ purified anti-human CD3 SF antibodies distributed by BioLegend.

In some embodiments, the anti-CD28 antibodies can be agonist clones with multiple host isotypes, such as human, mouse, rabbit, etc. For example, any of the following anti-CD28 antibodies can be used: (i) anti-CD28 [YTH 913.12] antibodies distributed by Absolute Antibody, (ii) CD28 antibodies, anti-human, clone 15E8 distributed by Miltenyi Biotec, (iii) Ultra-LEAF™ purified anti-human CD28 antibodies, clone cd28.2, distributed by BioLegend, or (iv) BD™ purified mouse anti-human CD28 antibodies, clone L293, distributed by BD Biosciences.

Cytokines were added to the medium and then returned to the 37° C. and 5% $CO_2$ incubator. The media was exchanged every ~3 days with fresh media supplemented with cytokines.

Figure 5A:
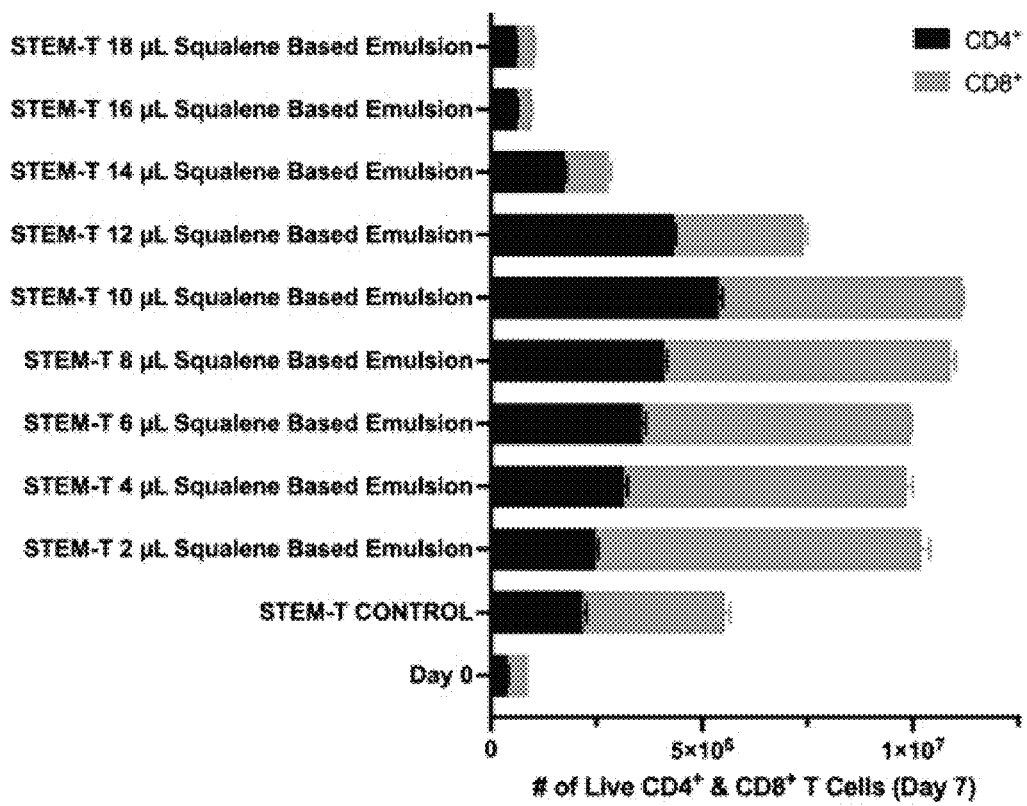
FIGS. 5A and 5B are stacked bar graphs illustrating the population of live T cells (CD4$^+$ T cells and CD8$^+$ T cells) determined using flow cytometry on days 7 and 10, respectively. Squalene-based emulsions were added to the population of live T cells at the amounts shown. A STEM-T activated population of live T cells without squalene-based emulsions served as the control.
Figure 5B:
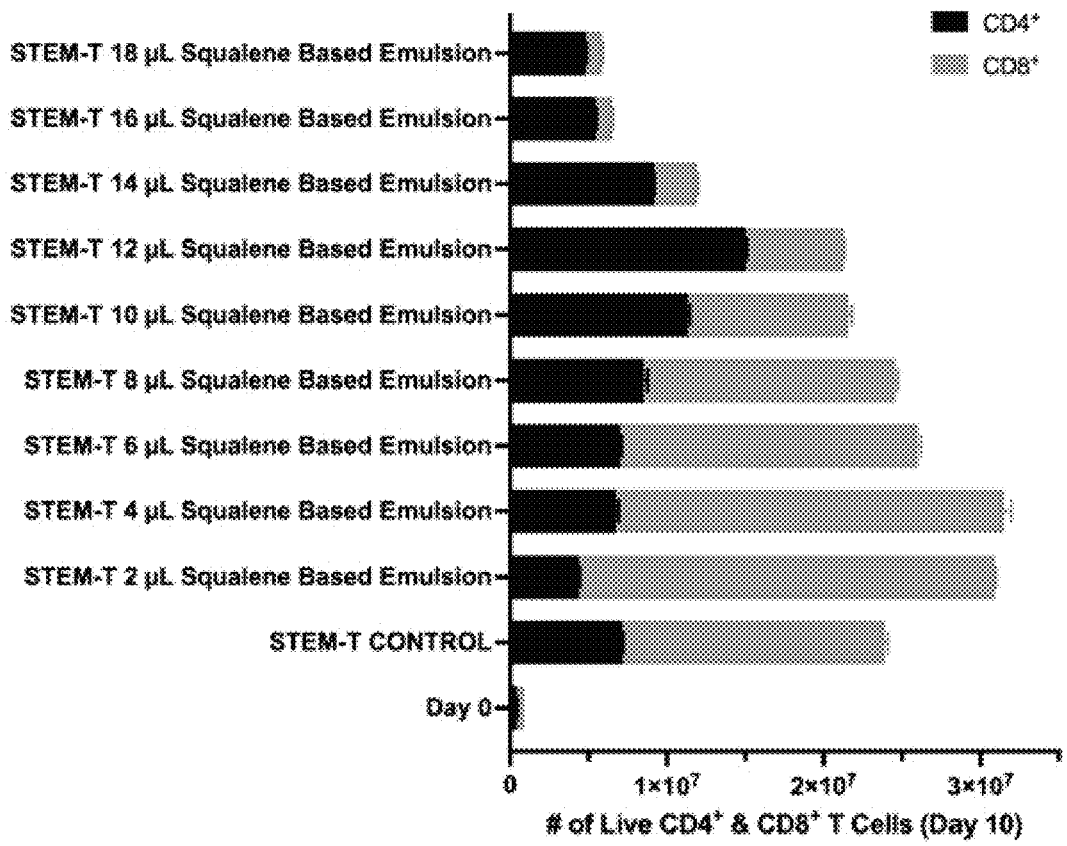

FIGS. 5A and 5B are stacked bar graphs illustrating the population of live T cells (CD4+ T cells and CD8+ T cells) determined using flow cytometry on days 7 and 10, respectively. Squalene-based emulsions were added to the population of live T cells at the following volumes after activating the live T cells with STEM-T: 2 µL, 4 µL, 6 µL, 8 µL, 10 µL, 12 µL, 14 µL, 16 µL, and 18 µL. The squalene-based emulsion used was AddaS03™ distributed by InvivoGen.

AddaS03™ is similar to Adjuvant System 03 (AS03), which is an adjuvant containing α-tocopherol and squalene in an oil-in-water emulsion. In clinical trials in humans, AS03 was shown to cause B cell memory, antibody responses, and CD4+ T cell responses, along with cytokine production [10].

As can be seen from FIGS. 5A-5B, the total number of live T cells (CD4+ T cells and CD8+ T cells combined) increased when compared to the STEM-T control in response to the addition of between 2 µL and 8 µL of the squalene-based emulsion (as measured on both days 7 and 10) and the addition of between 10 µL and 12 µL of the squalene-based emulsion (as measured on day 7).

Moreover, another unexpected result stemming from the experiments disclosed herein is that the number of live CD8+ T cells increased significantly when compared to the STEM-T control in response to the addition of between 2 µL and 10 µL of the squalene-based emulsion, as measured on day 7, and the addition of between 2 µL and 4 µL of the squalene-based emulsion, as measured on day 10.

Furthermore, yet another unexpected result stemming from the experiments disclosed herein is that the number of live CD4+ T cells increased significantly when compared to the STEM-T control in response to the addition of between 10 µL and 12 µL of the squalene-based emulsion, as measured on days 7 and 10. Moreover, as can be seen in FIGS. 5A and 5B, the number of live CD4+ T cells increased when compared to the STEM-T control in response to the addition of between 2 µL and 12 µL of the squalene-based emulsion, as measured on day 7, and the addition of between 8 µL and 14 µL of the squalene-based emulsion, as measured on day 10.

Example 4: Squalene-Based Emulsions Change the Composition of T Cells Expanded in Vitro One unexpected result stemming from the experiments disclosed herein is that squalene-based emulsions can change the composition of T cells such that the percentages of CD4+ T cells and CD8+ T cells can be modulated.

Flow cytometry was also used to determine the percentage of CD4+ T cells relative to CD8+ T cells for the T cells expanded using the method discussed in Example 3.

Figure 6A:
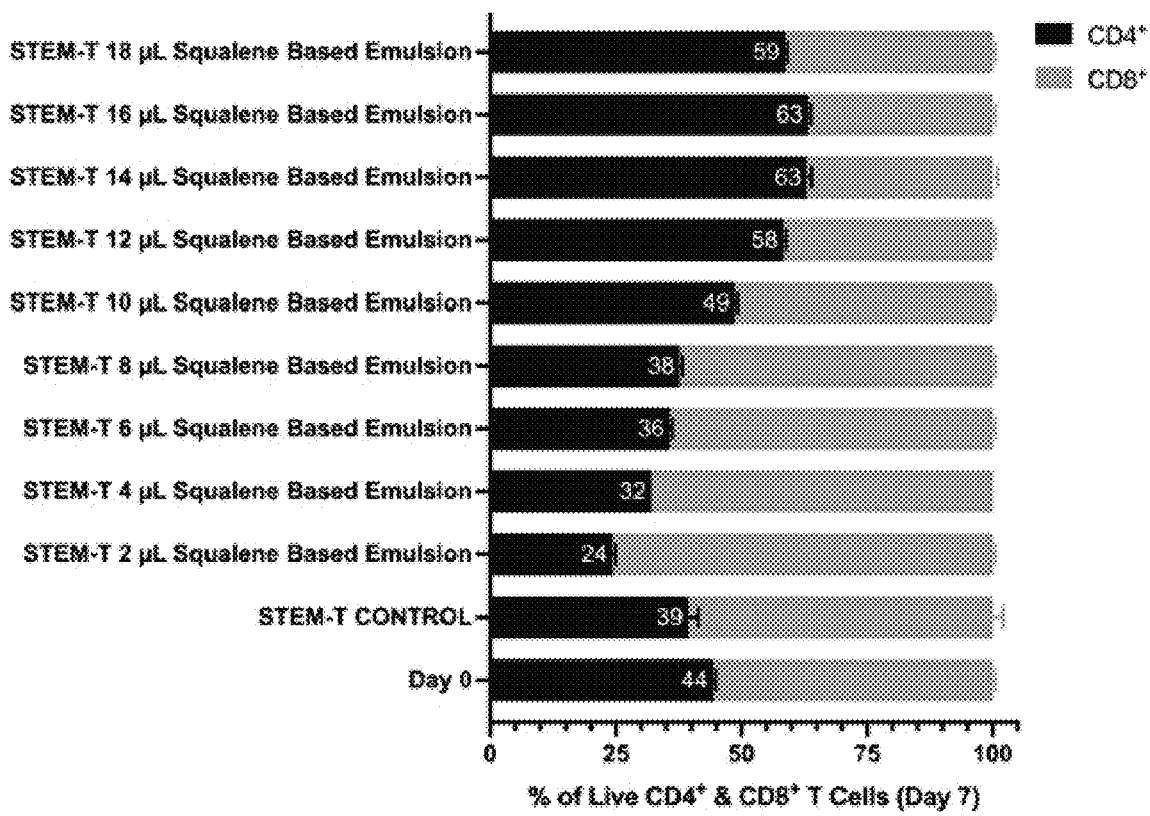
FIGS. 6A and 6B are stacked bar graphs illustrating the percentage of CD4$^+$ T cells relative to CD8$^+$ T cells as determined using flow cytometry on days 7 and 10, respectively. Squalene-based emulsions were added to the population of live T cells at the amounts shown. A STEM-T activated population of live T cells without squalene-based emulsions served as the control.
Figure 6B:
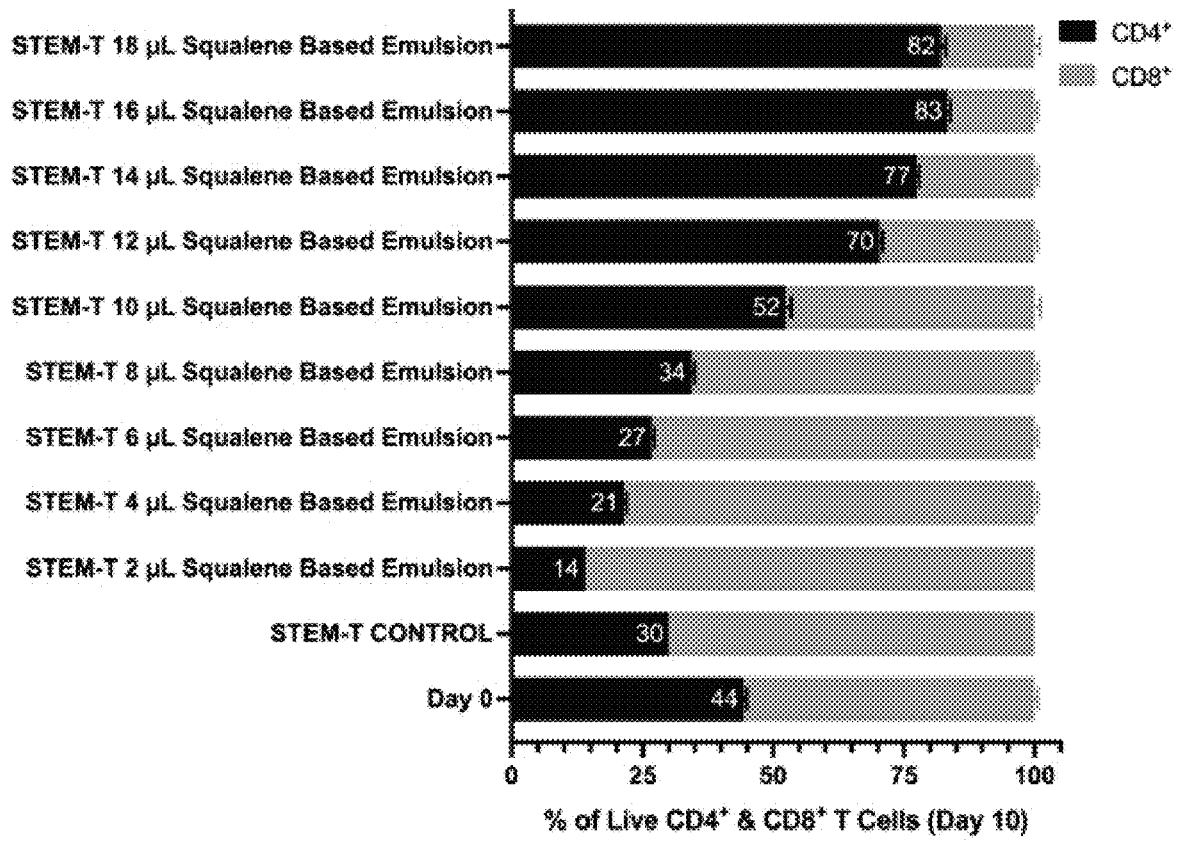

FIGS. 6A and 6B are stacked bar graphs illustrating the percentage of CD4+ T cells relative to CD8+ T cells as determined using flow cytometry on days 7 and 10, respectively.

Squalene-based emulsions were added to the population of live T cells at the following volumes after activating the live T cells with STEM-T: 2 µL, 4 µL, 6 µL, 8 µL, 10 µL, 12 µL, 14 µL, 16 µL, and 18 µL. The squalene-based emulsion used was AddaS03™ distributed by InvivoGen.

As can be seen from FIGS. 6A and 6B, the percentage of CD8+ T cells increased when compared to the STEM-T control in response to the addition of between 2 µL and 8 µL of the squalene-based emulsion, as measured on day 7, and the addition of between 2 µL and 6 µL of the squalene-based emulsion, as measured on day 10.

Moreover, as can be seen from FIGS. 6A and 6B, the percentage of CD4+ T cells increased when compared to the STEM-T control in response to the addition of between 10 µL and 18 µL of the squalene-based emulsion, as measured on day 7, and the addition of between 8 µL and 18 µL of the squalene-based emulsion, as measured on day 10. The percentage of CD4+ T cells increased significantly when compared to the STEM-T control when at least 10 µL of the squalene-based emulsion was added.

A number of embodiments have been described. Nevertheless, it will be understood by one of ordinary skill in the art that various changes and modifications can be made to this disclosure without departing from the spirit and scope of the embodiments. Elements of systems, devices, apparatus, and methods shown with any embodiment are exemplary for the specific embodiment and can be used in combination or otherwise on other embodiments within this disclosure. For example, the steps of any methods depicted in the figures or described in this disclosure do not require the particular order or sequential order shown or described to achieve the desired results. In addition, other steps operations may be provided, or steps or operations may be eliminated or omitted from the described methods or processes to achieve the desired results. Moreover, any components or parts of any apparatus or systems described in this disclosure or depicted in the figures may be removed, eliminated, or omitted to achieve the desired results. In addition, certain components or parts of the systems, devices, or apparatus shown or described herein have been omitted for the sake of succinctness and clarity.

Accordingly, other embodiments are within the scope of the following claims and the specification and/or drawings may be regarded in an illustrative rather than a restrictive sense.

Each of the individual variations or embodiments described and illustrated herein has discrete components and features which may be readily separated from or combined with the features of any of the other variations or embodiments. Modifications may be made to adapt a particular situation, material, composition of matter, process, process act(s) or step(s) to the objective(s), spirit, or scope of the present invention.

Methods recited herein may be carried out in any order of the recited events that is logically possible, as well as the recited order of events. Moreover, additional steps or operations may be provided or steps or operations may be eliminated to achieve the desired result.

Furthermore, where a range of values is provided, every intervening value between the upper and lower limit of that range and any other stated or intervening value in that stated range is encompassed within the invention. Also, any optional feature of the inventive variations described may be set forth and claimed independently, or in combination with any one or more of the features described herein. For example, a description of a range from 1 to 5 should be considered to have disclosed subranges such as from 1 to 3, from 1 to 4, from 2 to 4, from 2 to 5, from 3 to 5, etc. as well as individual numbers within that range, for example 1.5, 2.5, etc. and any whole or partial increments therebetween.

All existing subject matter mentioned herein (e.g., publications, patents, patent applications, and journal articles) are incorporated by reference herein in their entireties except insofar as the subject matter may conflict with that of the present invention (in which case what is present herein shall prevail). The referenced items are provided solely for their disclosure prior to the filing date of the present application. Nothing herein is to be construed as an admission that the present invention is not entitled to antedate such material by virtue of prior invention.

Reference to a singular item, includes the possibility that there are plural of the same items present. More specifically, as used herein and in the appended claims, the singular forms "a," "an," "said" and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation. Unless defined otherwise, all technical and scientific terms used herein have the same meaning as commonly understood by one of ordinary skill in the art to which this invention belongs.

Reference to the phrase "at least one of", when such phrase modifies a plurality of items or components (or an enumerated list of items or components) means any combination of one or more of those items or components. For example, the phrase "at least one of A, B, and C" means: (i) A; (ii) B; (iii) C; (iv) A, B, and C; (v) A and B; (vi) B and C; or (vii) A and C.

In understanding the scope of the present disclosure, the term "comprising" and its derivatives, as used herein, are intended to be open-ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" "element," or "component" when used in the singular can have the dual meaning of a single part or a plurality of parts. As used herein, the following directional terms "forward, rearward, above, downward, vertical, horizontal, below, transverse, laterally, and vertically" as well as any other similar directional terms refer to those positions of a device or piece of equipment or those directions of the device or piece of equipment being translated or moved.

Finally, terms of degree such as "substantially", "about" and "approximately" as used herein mean the specified value or the specified value and a reasonable amount of deviation from the specified value (e.g., a deviation of up to ±0.1%, ±1%, ±5%, or ±10%, as such variations are appropriate) such that the end result is not significantly or materially changed. For example, "about 1.0 cm" can be interpreted to mean "1.0 cm" or between "0.9 cm and 1.1 cm." When terms of degree such as "about" or "approximately" are used to refer to numbers or values that are part of a range, the term can be used to modify both the minimum and maximum numbers or values.

The structures in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

All cited references are hereby incorporated by reference in their entireties.

This disclosure is not intended to be limited to the scope of the particular forms set forth, but is intended to cover alternatives, modifications, and equivalents of the variations or embodiments described herein. Further, the scope of the disclosure fully encompasses other variations or embodiments that may become obvious to those skilled in the art in view of this disclosure.

REFERENCES

[1] Centers for Disease Control and Prevent, *Adjuvants and Vaccines.* Retrieved Jul. 9, 2023 from https://www.cdc.gov/vaccinesafety/concerns/adjuvants.html.
[2] Shi, S. et al. Vaccine adjuvants: Understanding the structure and mechanism of adjuvanticity. Vaccine 37, 3167-3178 (2019).
[3] Hearnden, Claire, and Ed C. Lavelle. Adjuvant strategies for vaccines: the use of adjuvants within the cancer vaccine setting. Cancer Immunotherapy. Academic Press, 333-349 (2013).
[4] Singh, M. & O'Hagan, D. T. Recent advances in veterinary vaccine adjuvants. *Int. J. Parasitol.* 33, 469-478 (2003).
[5] Wang, P. Natural and Synthetic Saponins as Vaccine Adjuvants. Vaccines (Basel) 9, 222 (2021).
[6] Lacaille-Dubois, Marie-Aleth. Updated insights into the mechanism of action and clinical profile of the immunoadjuvant QS-21: A review. *Phytomedicine* 60:152905 (2019).
[7] Zhu, Daming, and Wenbin Tuo. QS-21: a potent vaccine adjuvant. *Natural Products Chemistry & Research* 3.4 (2016).
[8] Kensil, Charlotte R., et al. Separation and characterization of saponins with adjuvant activity from *Quillaja saponaria* Molina cortex. *Journal of Immunology* 146.2:431-437 (1991).
[9] Romagnani, Sergio. Th1/th2 cells. *Inflammatory bowel diseases* 5.4:285-294 (1999).
[10] Morel, Sandra, et al. Adjuvant System AS03 containing α-tocopherol modulates innate immune response and leads to improved adaptive immunity. Vaccine 29.13:2461-2473 (2011).

We claim:

1. A reagent for activating and expanding CD4$^+$ T cells and CD8$^+$ T cells in vitro, comprising:
   a *Quillaja* saponin in solution at a concentration between 8 ug/ml and 18 ug/mL,
   wherein the *Quillaja* saponin comprises QS-21;
   and an activation reagent, comprising a plurality of self-assembling protein nanoparticles bound to anti-CD3 antibodies and anti-CD28 antibodies,
   wherein the self-assembling nanoparticles comprises protein cage polypeptides assembled into a tetrahedral pyramid,
   and wherein the CD4$^+$ T cells and CD8$^+$ T cells are CD3$^+$ human peripheral blood cells.

2. The reagent of claim 1, wherein at least one of the protein cage polypeptides comprises an amino acid sequence with at least 70% identity to the Seq ID No. 1.

3. The reagent of claim 1, wherein at least one of the protein cage polypeptides comprises an amino acid sequence with at least 70% identity to the Seq ID No. 2.

4. The reagent of claim 1, wherein at least one of the protein cage polypeptides comprises an amino acid sequence with at least 70% identity to the Seq ID No. 3.

* * * * *

SEQUENCE LISTING

```
Sequence total quantity: 3
SEQ ID NO: 1            moltype = AA  length = 478
FEATURE                 Location/Qualifiers
source                  1..478
                        mol_type = protein
                        organism = synthetic construct
SEQUENCE: 1
MPFITVGQEN STSIDLYYED HGTGTPVVLI HGFPLSGHSW ERQSAALLDA GYRVITYDRR   60
GFGQSSQPTT GYDYDTFAAD LNTVLETLDL QDAVLVGFSM GTGEVARYVS SYGTARIAAV  120
AFLASLEPFL LKTDDNPDGA APQEFFDGIV AAVKADRYAF YTGFFNDFYN LDENLGTRIS  180
EEAVRNSWNT AASGGFFAAA AAPTTWYTDF RADIPRIDVP ALILHGTGDR TLPIENTARV  240
FHKALPSAEY VEVEGAPHGL LWTHAEEVNT ALLAFLAKAQ EAQKQKLLTE VETYVLSIIP  300
SGPLKAEIAQ RLEDVFAGRW GSGADCAWHL GELVWCTAGS GWEDLEVLME WLKTRPILSP  360
LTKGILGFVF TLTVPSERGL QRRRFVQNAL NGNGDPNNMD KAVKLYRKLK REITFHGAKE  420
ISLSYSAGAL ASCMGLIYNR MGAVTTEVAF GLVCATCEQI ADSQHRSHRQ LEHHHHHH    478

SEQ ID NO: 2            moltype = AA  length = 478
FEATURE                 Location/Qualifiers
source                  1..478
                        mol_type = protein
                        organism = synthetic construct
```

```
SEQUENCE: 2
MPFITVGQEN STSIDLYYED HGTGTPVVLI HGFPLSGHSW ERQSAALLDA GYRVITYDRR    60
GFGQSSQPTT GYDYDTFAAD LNTVLETLDL QDAVLVGFSM GTGEVARYVS SYGTARIAAV   120
AFLASLEPFL LKTDDNPDGA APQEFFDGIV AAVKADRYAF YTGFFNDFYN LDENLGTRIS   180
EEAVRNSWNT AASGGFFAAA AAPTTWYTDF RADIPRIDVP ALILHGTGDR TLPIENTARV   240
FHKALPSAEY VEVEGAPHGL LWTHAEEVNT ALLAFLAKAQ EAQKQKLLTE VETYVLSIIP   300
SGPLKAEIAQ RLEDVFAGGG RWGADCAWHL GELVWCTAGW EGGDLEVLME WLKTRPILSP   360
LTKGILGFVF TLTVPSERGL QRRRFVQNAL NGNGDPNNMD KAVKLYRKLK REITFHGAKE   420
ISLSYSAGAL ASCMGLIYNR MGAVTTEVAF GLVCATCEQI ADSQHRSHRQ LEHHHHHH    478

SEQ ID NO: 3            moltype = AA  length = 470
FEATURE                 Location/Qualifiers
source                  1..470
                        mol_type = protein
                        organism = synthetic construct
SEQUENCE: 3
MPFITVGQEN STSIDLYYED HGTGTPVVLI HGFPLSGHSW ERQSAALLDA GYRVITYDRR    60
GFGQSSQPTT GYDYDTFAAD LNTVLETLDL QDAVLVGFSM GTGEVARYVS SYGTARIAAV   120
AFLASLEPFL LKTDDNPDGA APQEFFDGIV AAVKADRYAF YTGFFNDFYN LDENLGTRIS   180
EEAVRNSWNT AASGGFFAAA AAPTTWYTDF RADIPRIDVP ALILHGTGDR TLPIENTARV   240
FHKALPSAEY VEVEGAPHGL LWTHAEEVNT ALLAFLAKAQ EAQKQKLLTE VETYVLSIIP   300
SGPLKAEIAQ RLEDVFAGGA DCAWHLGELV WCTAGDLEVL MEWLKTRPIL SPLTKGILGF   360
VFTLTVPSER GLQRRRFVQN ALNGNGDPNN MDKAVKLYRK LKREITFHGA KEISLSYSAG   420
ALASCMGLIY NRMGAVTTEV AFGLVCATCE QIADSQHRSH RQLEHHHHHH             470
```